(12) United States Patent
Kim

(10) Patent No.: US 11,533,703 B2
(45) Date of Patent: Dec. 20, 2022

(54) PAGING METHOD AND DEVICE IN UNLICENSED BAND

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/051,712

(22) PCT Filed: Aug. 14, 2019

(86) PCT No.: PCT/KR2019/010382
§ 371 (c)(1),
(2) Date: Oct. 29, 2020

(87) PCT Pub. No.: WO2020/036442
PCT Pub. Date: Feb. 20, 2020

(65) Prior Publication Data
US 2021/0250896 A1    Aug. 12, 2021

(30) Foreign Application Priority Data

Aug. 17, 2018    (KR) .................. 10-2018-0096194
Aug. 13, 2019    (KR) .................. 10-2019-0098670

(51) Int. Cl.
*H04W 16/14* (2009.01)
*H04W 68/02* (2009.01)
(Continued)

(52) U.S. Cl.
CPC ......... *H04W 68/005* (2013.01); *H04W 24/08* (2013.01); *H04W 72/042* (2013.01); *H04W 72/0466* (2013.01); *H04W 76/28* (2018.02)

(58) Field of Classification Search
CPC . H04W 68/005; H04W 24/08; H04W 72/042; H04W 72/0466; H04W 76/28; H04W 16/14; H04W 68/02
(Continued)

(56) References Cited

U.S. PATENT DOCUMENTS

2009/0238091 A1*    9/2009    Kim .................. H04L 5/0053
                                                            370/252
2011/0021228 A1    1/2011    Kim et al.
(Continued)

FOREIGN PATENT DOCUMENTS

EP    2104294 A2    9/2009
EP    3373486 A1    9/2018
(Continued)

OTHER PUBLICATIONS

Samsung, "Reference Frame & PO Determination: Non Default Association", R2-1807689, 3GPP TSG-RAN2 102, Busan, South Korea, May 21-May 25, 2018.
(Continued)

*Primary Examiner* — Inder P Mehra
(74) *Attorney, Agent, or Firm* — IP Legal Services, LLC

(57) ABSTRACT

Provided are a paging method and device in an unlicensed band. The method may include receiving configuration information about at least two paging occasions (POs) for paging in an unlicensed band; and sequentially monitoring a downlink control channel (PDCCH) in the paging occasions until a paging message is received on the basis of the configuration information.

12 Claims, 18 Drawing Sheets

(51) Int. Cl.
  *H04W 68/00* (2009.01)
  *H04W 24/02* (2009.01)
  *H04W 72/04* (2009.01)
  *H04W 76/38* (2018.01)
  *H04W 76/28* (2018.01)
  *H04W 24/08* (2009.01)

(58) Field of Classification Search
  USPC ........................................................ 370/329
  See application file for complete search history.

(56) References Cited

U.S. PATENT DOCUMENTS

| | | |
|---|---|---|
| 2011/0038275 A1 | 2/2011 | Kim et al. |
| 2015/0031382 A1 | 1/2015 | Damnjanovic et al. |
| 2015/0264667 A1* | 9/2015 | Lee ....................... H04L 5/0048 370/329 |
| 2016/0057731 A1 | 2/2016 | Damnjanovic et al. |
| 2016/0057738 A1* | 2/2016 | Lee .................. H04W 52/0216 370/329 |
| 2017/0272322 A1* | 9/2017 | You ..................... H04W 72/042 |
| 2018/0007657 A1 | 1/2018 | Damnjanovic et al. |
| 2018/0054822 A1 | 2/2018 | Kim et al. |
| 2018/0212736 A1 | 7/2018 | Chatterjee et al. |
| 2018/0234965 A1 | 8/2018 | Ahn et al. |
| 2019/0028999 A1* | 1/2019 | Yerramalli ........... H04B 1/7143 |
| 2019/0229825 A1 | 7/2019 | Ahn et al. |
| 2020/0007259 A1 | 1/2020 | Ahn et al. |
| 2020/0266952 A1 | 8/2020 | Chatterjee et al. |
| 2021/0337502 A1* | 10/2021 | Phan ..................... H04W 68/02 |

FOREIGN PATENT DOCUMENTS

| | | |
|---|---|---|
| KR | 10-1836390 B1 | 3/2018 |
| WO | 2016/144002 A1 | 9/2016 |
| WO | 2017/026971 A1 | 2/2017 |
| WO | 2017/145120 A1 | 8/2017 |
| WO | WO-2018084660 A1 * | 5/2018 ............... H04L 1/00 |

OTHER PUBLICATIONS

European Patent Office, European Search Report of corresponding EP Patent Application No. 19850521.6, Apr. 22, 2022.

* cited by examiner

PAGING METHOD AND DEVICE IN UNLICENSED BAND

CROSS REFERENCE TO RELATED APPLICATIONS

This application is a National Stage Patent Application of PCT International Patent Application No. PCT/KR2019/010382 (filed on Aug. 14, 2019) under 35 U.S.C. § 371, which claims priority to Korean Patent Application Nos. 10-2018-0096194 (filed on Aug. 17, 2018), and 10-2019-0098670 (filed on Aug. 13, 2019), the teachings of which are incorporated herein in their entireties by reference.

TECHNICAL FIELD

The present disclosure relates to methods and devices for performing paging in an unlicensed band in a next-generation wireless access network (hereinafter, "new radio (NR)").

BACKGROUND ART

The 3GPP has recently authorized "Study on New Radio Access Technology" which is a research item for next-generation radio access technology (in other words, 5G radio access technology). On the basis of the Study on New Radio Access Technology, Radio access network working group 1 (RAN WG1) has been discussing frame structures of new radio (NR), channel coding, channel coding & modulation, and waveform & multiple access scheme. It is required to design NR not only to provide an improved data transmission rate as compared with the long term evolution (LTE)/LTE-Advanced, but also to meet various requirements in detailed and specific usage scenarios.

As representative usage scenarios of NR, enhancement mobile broadband (eMBB), massive machine type communication (mMTC), and ultra-reliable and low latency communications (URLLC) have been defined. In order to meet the requirements for each usage scenario, it is required to design NR to have a flexible frame structure as compared with LTE.

Each usage scenario has different requirements for data rates, latency, reliability, and coverage. Thus, a need arises for a scheme of efficiently multiplexing radio resource units based on different numerologies (e.g., subcarrier spacing, subframe, transmission time interval (TTI), etc.) as a method for efficiently meeting the requirements for each usage scenario via the frequency band constituting any NR system.

As a part of such aspect, there is a demand for developing a design for performing paging in order to perform radio communication using an unlicensed band in NR.

DETAILED DESCRIPTION OF THE INVENTION

Technical Problem

According to embodiments, there may be provided a paging method and device in an unlicensed band, which may configure an additional paging window for paging in an unlicensed band.

According to embodiments, there may be provided a paging method and device in an unlicensed band, which may change a PDCCH monitoring time for paging in an unlicensed band.

Technical Solution

In an aspect, according to embodiments, a method may be provided for performing paging in an unlicensed band by a user equipment (UE). The method may include receiving configuration information about a paging occasion (PO) for paging in the unlicensed band and monitoring a downlink control channel (PDCCH) in the paging occasion based on the configuration information. The paging occasion is configured of at least two paging occasions in a paging frame. Monitoring the PDCCH includes sequentially monitoring the PDCCH for the at least two paging occasions until a paging message is received.

In another aspect, according to embodiments, a method may be provided for performing paging in an unlicensed band by a base station. The method may include transmitting configuration information about a paging occasion (PO) for paging in the unlicensed band and transmitting a downlink control channel (PDCCH) in the paging occasion based on the configuration information. The configuration information includes information about at least two or more paging occasions. Transmitting the PDCCH includes sequentially transmitting the PDCCH for the at least two or more paging occasions.

In still another aspect, according to embodiments, a UE may be provided for performing paging in an unlicensed band. The UE may include a receiver receiving configuration information about a paging occasion (PO) for paging in the unlicensed band and a controller monitoring a downlink control channel (PDCCH) in the paging occasion based on the configuration information. The paging occasion is configured of at least two paging occasions in a paging frame. The controller sequentially monitors the PDCCH for the at least two paging occasions until a paging message is received.

In yet still another aspect, according to embodiments, a base station may be provided for performing paging in an unlicensed band. The base station may include a transmitter transmitting configuration information about a paging occasion (PO) for paging in the unlicensed band and transmitting a downlink control channel (PDCCH) in the paging occasion based on the configuration information and a controller controlling operations of the transmitter. The configuration information includes information about at least two or more paging occasions. The transmitter sequentially transmits the PDCCH for the at least two or more paging occasions.

Advantageous Effects

According to embodiments, there may be provided a paging method and device in an unlicensed band, which may reduce a paging non-transmission probability due to an LBT failure by configuring an additional paging window for paging in an unlicensed band.

According to embodiments, there may be provided a paging method and device in an unlicensed band, which may reduce a paging non-transmission probability due to an LBT failure by changing the PDCCH monitoring time for paging in an unlicensed band.

MODE FOR CARRYING OUT THE INVENTION

Figure 1:
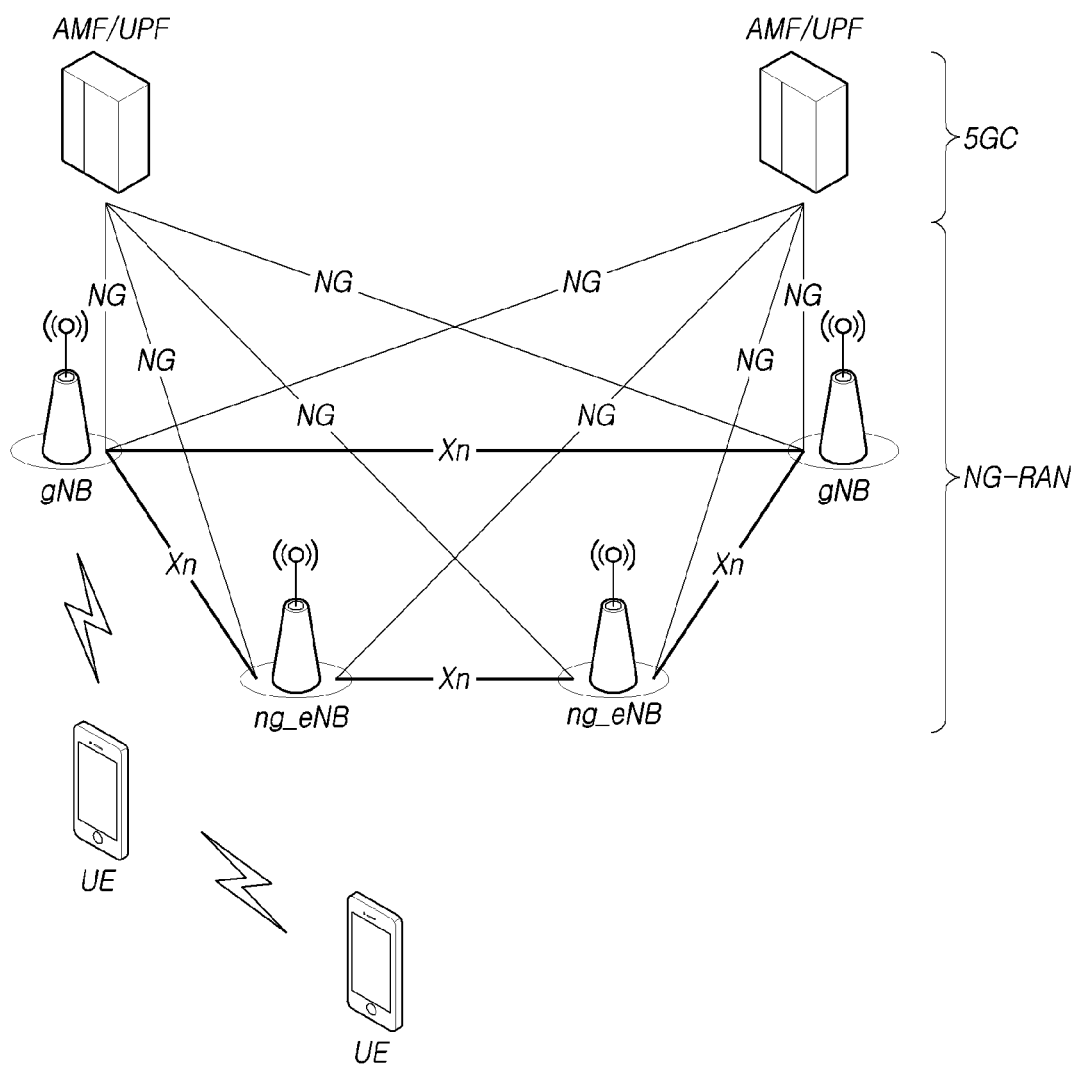
FIG. 1 is a view schematically illustrating an NR wireless communication system.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information through a control channel, such as a physical downlink control channel (PDCCH) and a physical uplink control channel (PUCCH). The uplink and downlink transmit and receive data through a data channel such as a physical downlink shared channel (PDSCH) and a physical uplink shared channel (PUSCH). Hereinafter, the transmission and reception of a signal through a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR discloses a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part, and the NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end, and the ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario through frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP), and, as shown in Table 1 below, "µ" is used as an exponential value of 2 so as to be changed exponentially on the basis of 15 kHz.

TABLE 1

| µ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
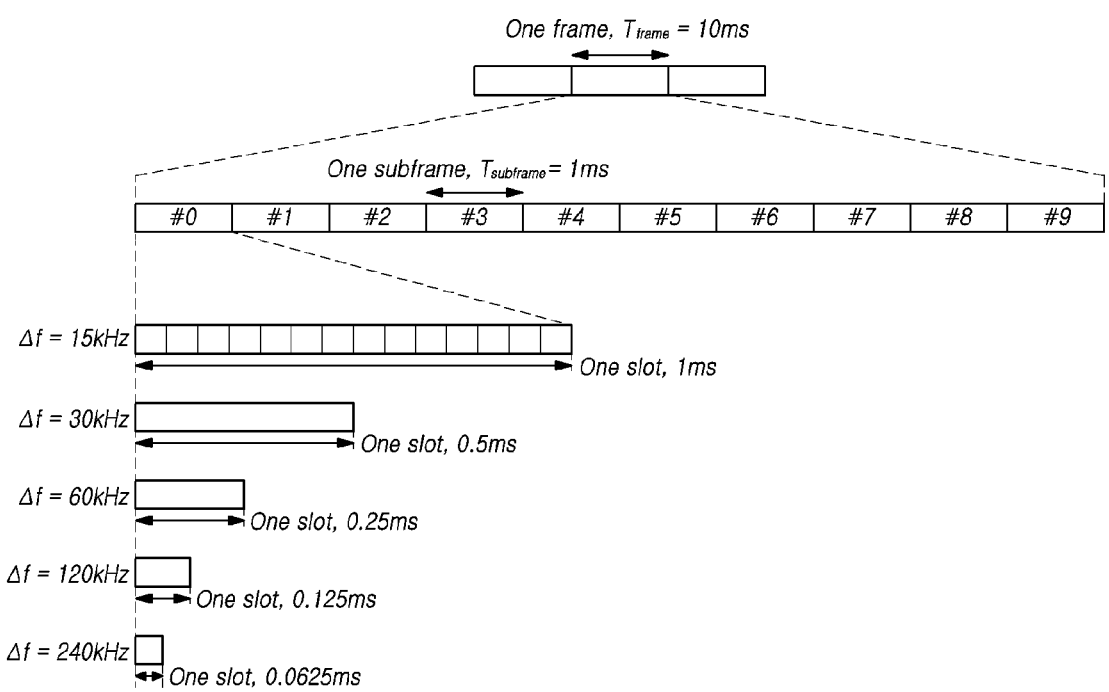
FIG. 2 is a view for explaining a frame structure in an NR system.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-colocation (QC/QCL) relationship. The large-scale properties include at least one of delay spread, Doppler spread, a frequency shift, an average received power, and a received timing.

Figure 3:
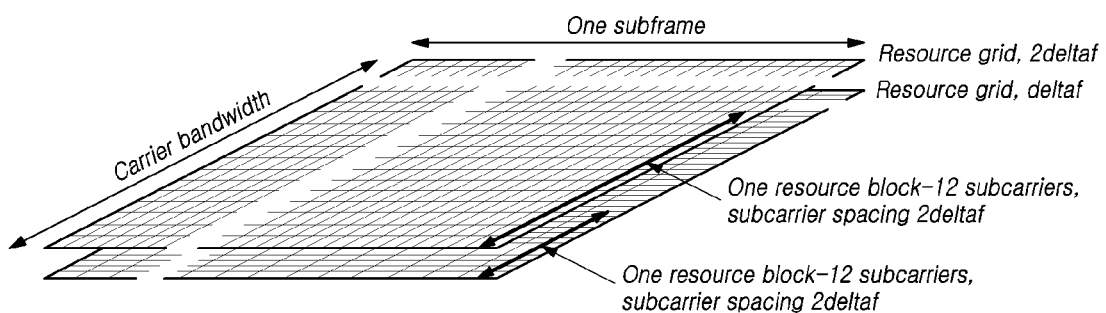
FIG. 3 is a view for explaining resource grids supported by a radio access technology.

FIG. 3 is a view for explaining resource grids supported by a radio access technology.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
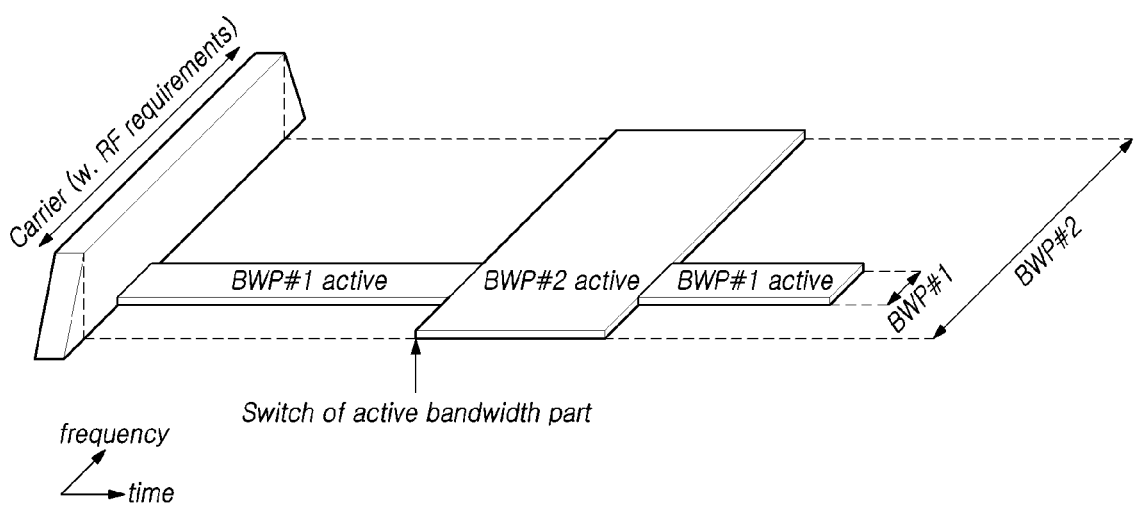
FIG. 4 is a view for explaining bandwidth parts supported by a radio access technology.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink, and the UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
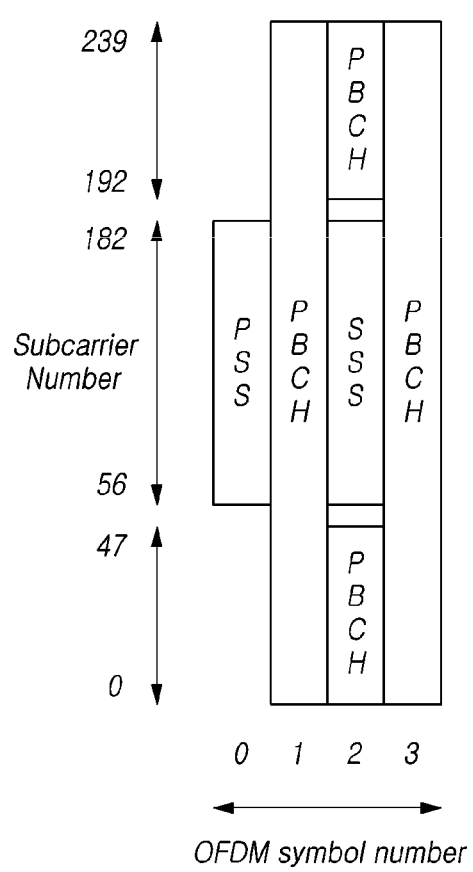
FIG. 5 is a view illustrating an example of a synchronization signal block in a radio access technology.

FIG. 5 is a view illustrating an example of a synchronization signal block in a radio access technology.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that can be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB through the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted through a PDSCH. In order to receive SIB1, the UE must receive numerology information used for the SIB1 transmission and the CORESET (control resource set) information used for scheduling of SIB1 through a PBCH. The UE identifies scheduling information for SIB1 using SI-RNTI in the CORESET, and acquires SIB1 on the PDSCH according to scheduling information. The remaining SIBs other than SIB1 may be periodically transmitted, or the remaining SIBs may be transmitted according to the request of the UE.

Figure 6:
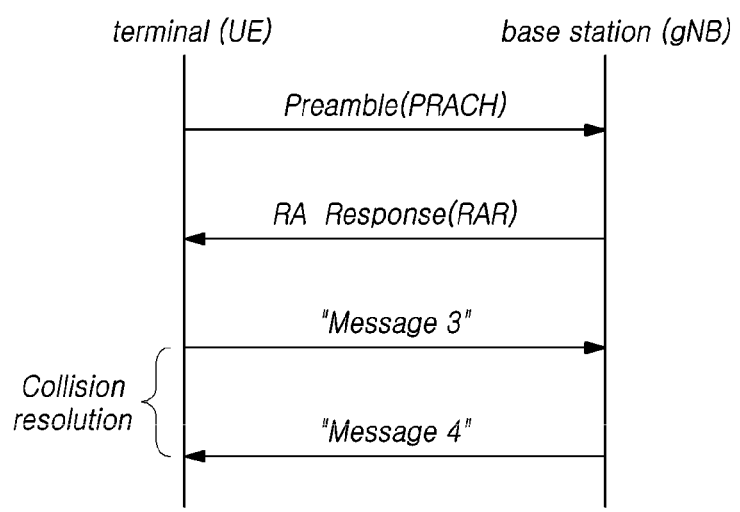
FIG. 6 is a view for explaining a random access procedure in a radio access technology.

FIG. 6 is a view for explaining a random access procedure in a radio access technology.

Referring to FIG. 6, if a cell search is completed, the UE transmits a random access preamble for random access to the base station. The random access preamble is transmitted through a PRACH. Specifically, the random access preamble is periodically transmitted to the base station through the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
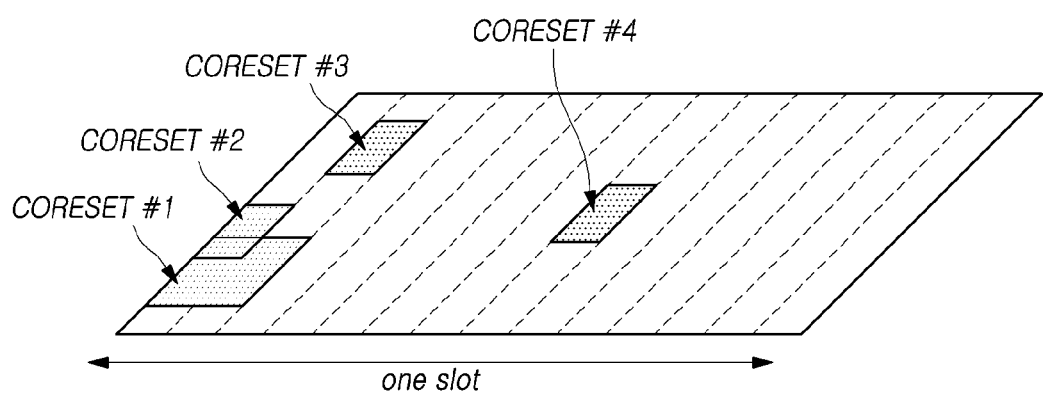
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

5G NR(New Rat)

The 3GPP supports a multiple subcarrier-based frame structure in relation to the frame structure of NR. In relation thereto, the default subcarrier spacing (SCS) is 15 kHz, and a total of five kinds of SCSs in the form of the product of 15 kHz and $2^\mu$ are supported. The SCS values according to $\mu$ are shown in Table 1 above.

Figure 8:
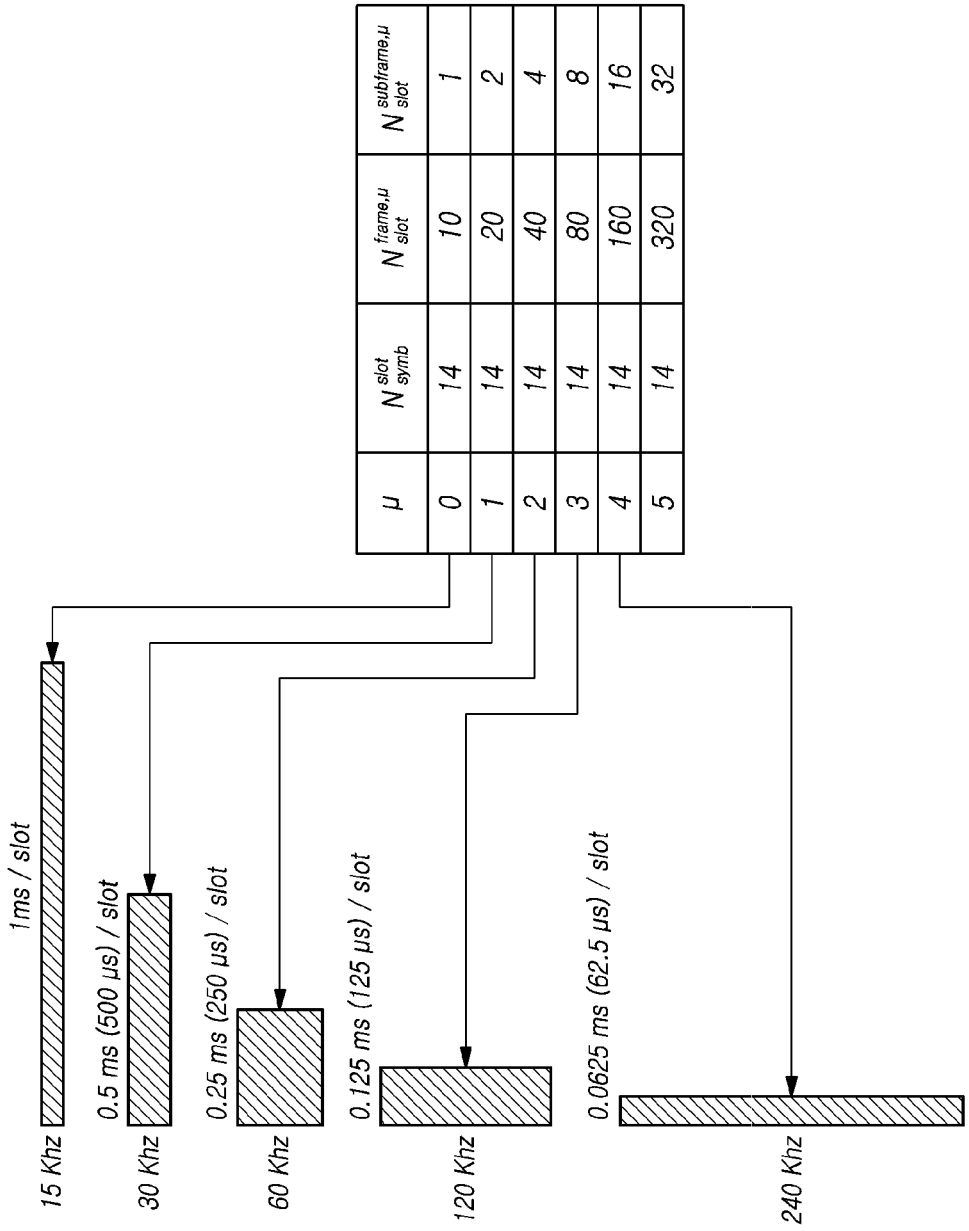
FIG. 8 is a view illustrating an example of symbol-level alignment in different SCSs.

Referring to FIG. 8, the slot length is varied depending on the numerology. In other words, as the slot length decreases, the SCS may increase. In NR, the slot is defined based on 14 OFDM symbols.

Figure 9:
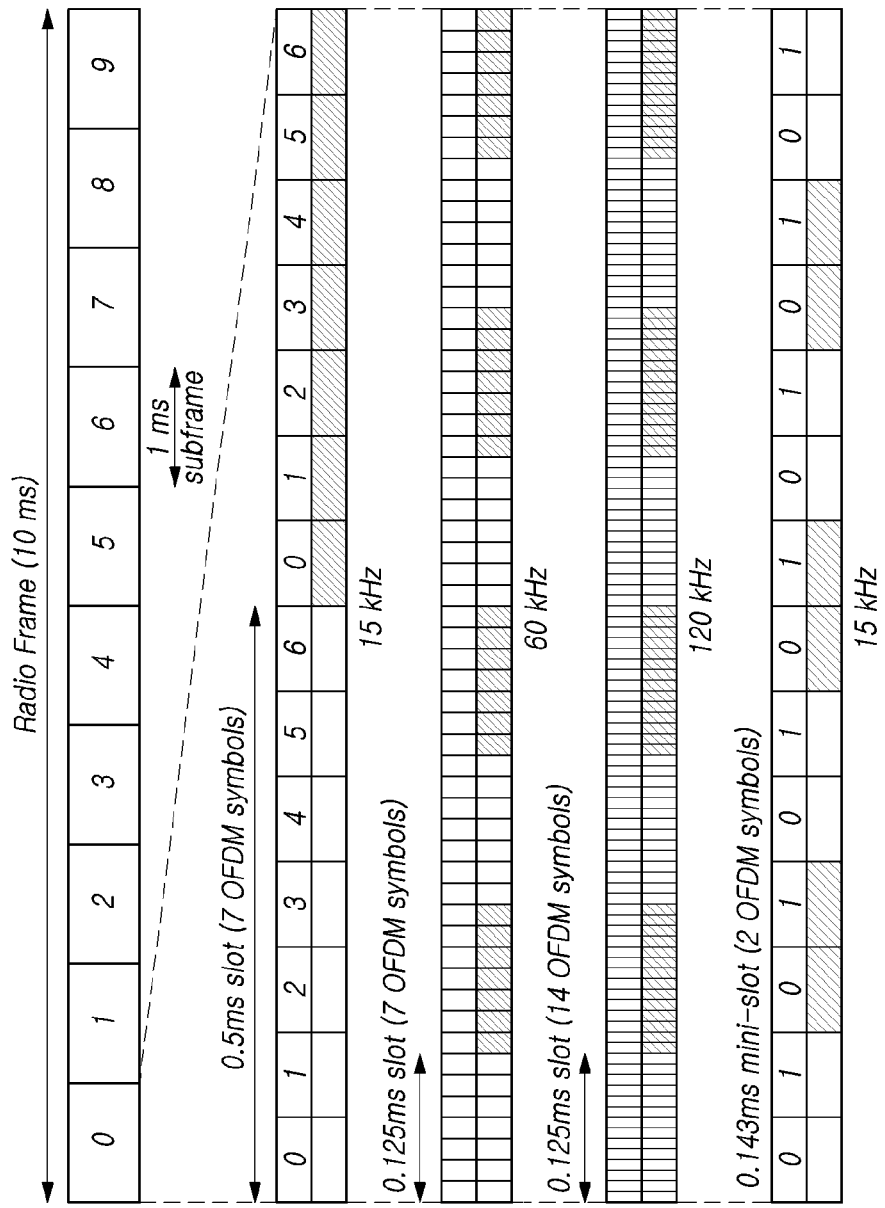
FIG. 9 is a view for explaining an NR time domain structure according to subcarrier spacing.

In NR, the following time domain structure on the time axis is supported. Unlike in legacy LTE, the default scheduling unit is changed to slot in NR. Referring to FIG. 9, the slot is configured of 14 OFDM symbols regardless of the subcarrier spacing. Further, NR also supports a non-slot structure configured of 2, 4, or 7 OFDM symbols, which is a smaller scheduling unit. The non-slot structure may be utilized as a scheduling unit for URLLC service.

The radio frame is set to 10 ms regardless of numerologies. The subframe, as a reference for time duration, is set to 1 ms. In NR, the subframe is not used in data/control scheduling units. The slot is used primarily in eMBB and includes 14 OFDM symbols. The non-slot, e.g., mini-slot, is used mainly in URLLC, but is not limited thereto, and includes 2, 4, or 7 OFDM symbols. The TTI duration is time duration for data/control channel transmission and is set to multiple OFDM symbols per slot/non-slot.

Unlicensed Band (NR-Based Access to Unlicensed Spectrum, NR-U)

Unlike the licensed band, the unlicensed band is not a radio channel that may be used exclusively by an operator but may be used by any business operator or individual to provide wireless communication services within the regulations of each country. Accordingly, when an NR service is provided through an unlicensed band, it is necessary to resolve the coexistence problem with various short-range wireless communication protocols such as Wi-Fi, Bluetooth, and NFC that are already provided through the unlicensed band and the problem with coexistence between NR operators or LTE operators.

Thus, upon providing an NR service via an unlicensed band, it is necessary to perform an LBT (Listen Before Talk)-based radio channel access method to determine whether the radio channel or carrier is available by sensing the power level of the radio channel or carrier to be used before transmitting a radio signal. to avoid interference or collision between radio communication services. In this case, where a specific radio channel or carrier in the corresponding unlicensed band is being used by other radio communication protocol or other operator, the provision of NR service via the band may be limited. Thus, the wireless communication system via an unlicensed band may not guarantee the QoS required by the user, unlike the wireless communication system via a licensed band.

In particular, in contrast to legacy LTE, which supports an unlicensed spectrum necessarily via carrier aggregation (CA) with a licensed spectrum, NR-U takes into consideration stand-alone NR-U cells, NR cells of licensed band, or NR-U cells based on dual connectivity (DC) with LTE cells, as a deployment scenario of unlicensed band NR and thus requires a design for a data transmission/reception method for the unlicensed band itself to meet the minimum QoS.

NR SSB

Figure 10:
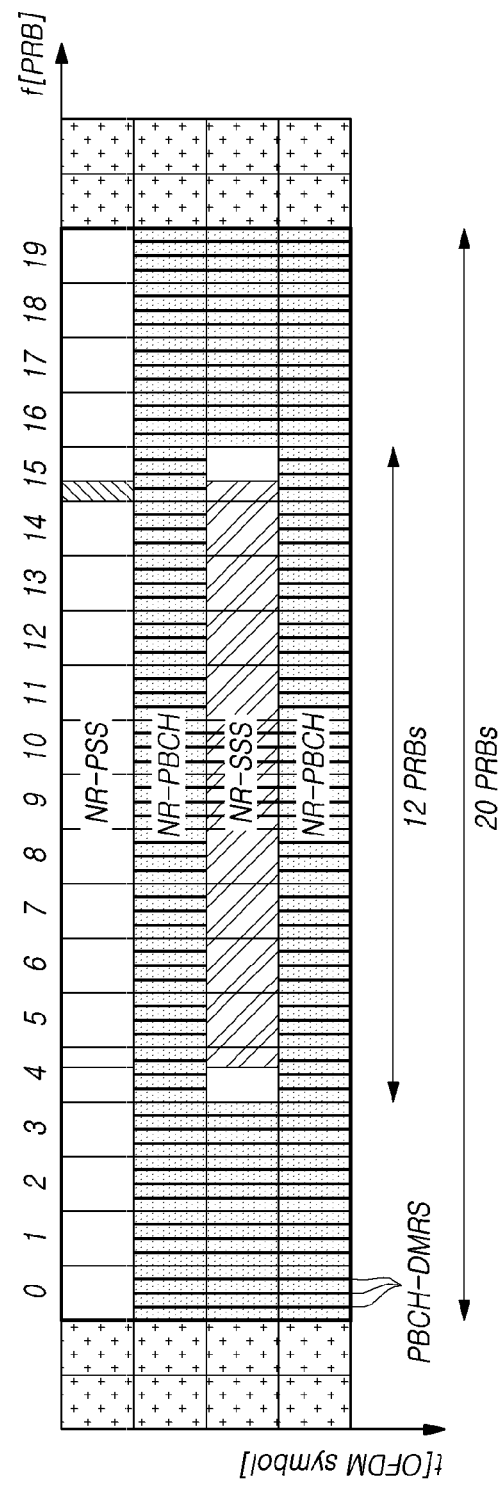
FIG. 10 is a view illustrating an NR PSS/SS/PBCH block.

Referring to FIG. 10, unlike in LTE, the NR synchronization signal block (SSB) may be transmitted in various subcarrier spacings and is transmitted along with PBCH all the time. Further, the minimum transmission band required is defined per subcarrier spacing as follows.

In 6 GHz, a band with 10 MHz and a 30 kHz SCS and 15 kHZ SCS and 5 MHz, except for some specific bands, such as n41, n77, and n78, are defined. In 6 GHz or more, a 120 kHz SCS and 10 MHz are defined.

Further, a different subcarrier spacing is supported per frequency band. In 1 GHz or less, an SCS of 15 kHz, 30 kHz, or 60 kHz is supported. In a band between 1 GHz and 6 GHz, an SCS of 15 kHz, 30 kHz, or 60 kHz is supported. In 24 GHz or more and 52.6 GHz or less, an SCS of 60 kHz or 120 kHz is supported. Further, 240 kHz does not apply to data.

Figure 11:
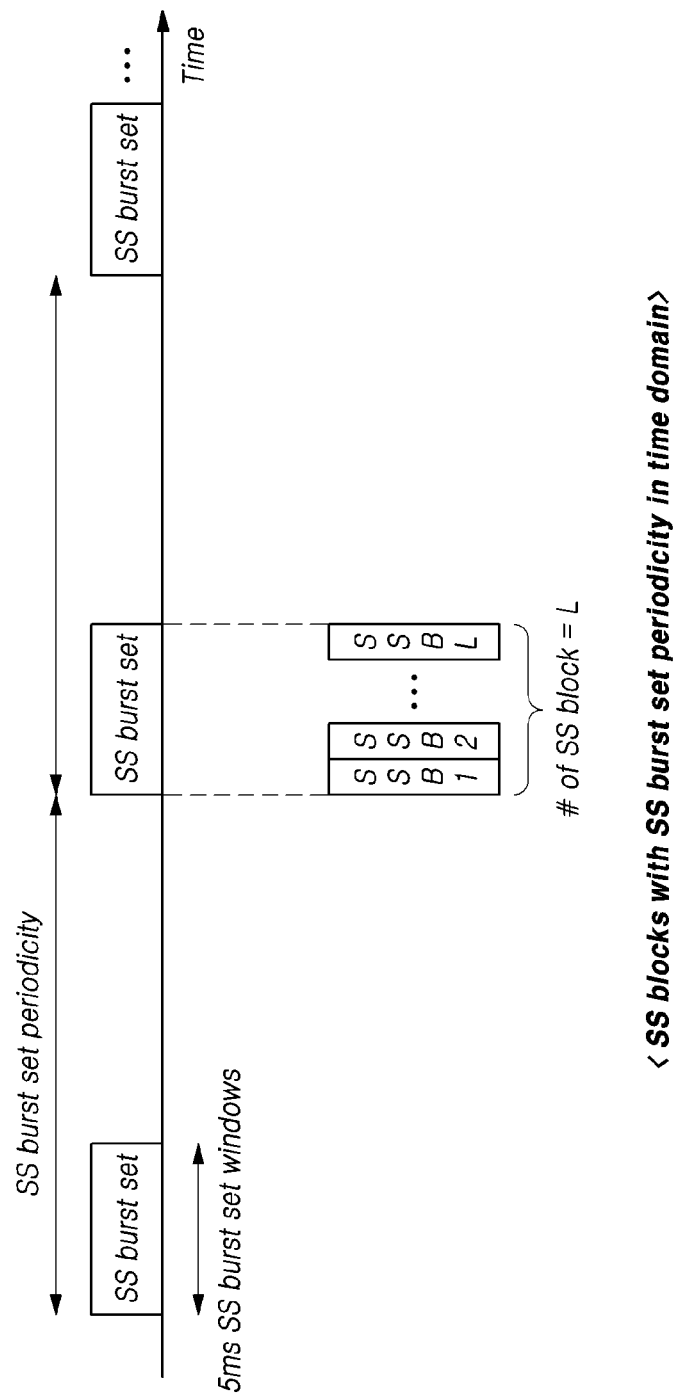
FIG. 11 is a view illustrating an SSB burst periodicity.

Referring to FIG. 11, an SSB is defined as an SSB burst set, rather than a single form, and is transmitted. Basically, the SSB burst set is 5 ms regardless of numerology, and the maximum number L of SSB blocks which may be transmitted in the set is as follows.

For the frequency range up to 3 GHz, L is set to 4. For the frequency range from 3 GHz to 6 GHz, L is set to 8. For the frequency range from 6 GHz to 52.6 HGz, L is set to 64.

The periodicity of transmission of the defined SSB burst set is additionally set by RRC and indicated to the UE. The UE performing initial access assumes a periodicity of 20 ms as default. After obtaining synchronization, the UE performs a system information update. Thereafter, the SSB burst periodicity value is finally updated by the base station.

NR/LTE Paging Procedure

In general, paging is performed in an idle mode. The UE power consumption may be saved by configuring the network to monitor paging messages in a predetermined period. To that end, monitoring is carried out in the following steps.

The UE stays in a sleep mode, according to the discontinuous reception (DRX) cycle during idle mode. In this case, a setting for the DRX cycle is defined via SIB2.

The UE periodically wakes up to monitor the PDCCH to identify whether to receive the paging message. The UE performs detection based on the paging radio network temporary identifier (P-RNTI).

If the PDCCH indicates the presence of a paging message in the corresponding subframe, the UE performs paging channel (PCH) detection, identifying its paging message.

Paging Occasion (PO) and Paging Frame (PF)

There are largely two terms for paging. These are paging frame (PF) and paging occasion (PO), which respectively mean the following. Paging occasion (PO) may mean a subframe that transmits the P-RNTI-based PDCCH processing the paging message. Paging frame (PF) may mean one radio frame where one or multiple paging occurs.

A specific method for application in relation thereto is described as follows.

1) In NR, the PF may be defined as (SFN+PF_offset) mod T=(T div N)*(UE_ID mod N) for the SFN which is the system frame number for the PF. In LTE/LTE-A, the PF may be defined as SFN mod T=(T div N)*(UE_ID mod N).

2) The PO is i_s which is the index indicating the start a set of PDCCH monitoring occasions for paging DCI, and the following definition may be made: i_s=floor (UE_ID/N) mod Ns, where, Ns=max (1, nB/T).

Here, T is the UE's DRX cycle, nB is the number of total paging occasions in T, N is min (T,nB), PF_offset is the offset used for PF determination, and UE_ID may be IMSI (International Mobile Subscriber Identity) mod 1024.

In NR, the parameters nB, PF_offset, and default DRX Cycle length may be signaled in SIB1 (SystemInformationBlock1). In LTE, the parameters may be signaled in SIB2.

Here, DRX cycle T is determined via two signalings. In other words, the smaller of the T value via RRC/upper layer and the nB value via SIB2 is selected and used. If the DRX cycle is not set via RRC, it is defined as the default value. Here, default means a value set via SIB2. In NR, this means a value set via SIB1.

Additionally, nB is a value set via SIB2 and is shown in Table 2.

TABLE 2

| nB | 4T | 2T | T | ½ T | ¼ T | ⅛ T | 1/16 T | 1/32 T |
|---|---|---|---|---|---|---|---|---|
| N | 1 | 1 | 1 | ½ | ¼ | ⅛ | 1/16 | 1/32 |

In the case of PO, if the number is determined, the subframes in the radio frame where the following paging occurs are determined.

TABLE 3

| | FDD: | | | |
|---|---|---|---|---|
| Ns | PO when i_s = 0 | PO when i_s = 1 | PO when i_s = 2 | PO when i_s = 3 |
| 1 | 9 | N/A | N/A | N/A |
| 2 | 4 | 9 | N/A | N/A |
| 4 | 0 | 4 | 5 | 9 |

In NR, since the time unit is determined on a per-slot basis, not on a per-subframe basis, its application is varied. In other words, although one PO occurs in the DRX period, the PDCCH monitoring the PO may be formed of multiple slots.

That is, where default association is configured, if Ns=1, one PO occurs in the PF and, if Ns=2, a PO occurs over 1' half frame and $2^{nd}$ half frame. In the case of non-default association, i.e., if a paging search space is configured, PDCCH monitoring is performed in specific slots from the start position of the PO.

Hereinafter, a method for performing paging in an unlicensed band will be described in detail with reference to relevant drawings.

Figure 12:
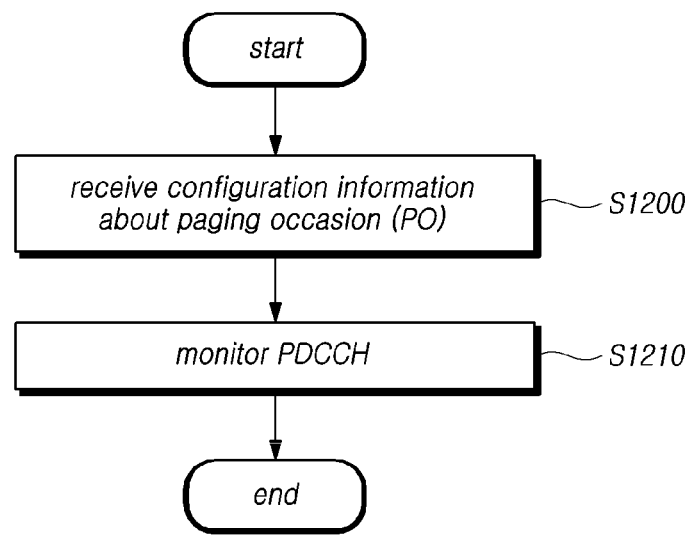
FIG. 12 is a flowchart illustrating a procedure of paging in an unlicensed band by a UE according to an embodiment.

FIG. 12 is a flowchart illustrating a procedure of paging in an unlicensed band by a UE according to an embodiment.

Referring to FIG. 12, the UE may receive configuration information for a paging occasion (PO) for paging in an unlicensed band (S1200).

Paging occurs once in one paging frame. In other words, paging occurs once in one radio frame, and the corresponding message occurs via PDCCH monitoring scrambled with the P-RNTI. The paging occasion may be configured of one slot or subframe or a set formed of several slots or subframes.

According to an embodiment, at least two paging occasions may be configured in the paging frame. That is, the second and subsequent paging occasions may be defined as a PDCCH monitoring region for receiving the paging message additionally configured in the existing paging occasion region. In this case, in the position of one UE, only one paging message is transmitted within one radio frame, and scheduling control information for the paging message may be transmitted via the PDCCH. Accordingly, the UE may have a chance of receiving an additional paging message by monitoring the PDCCH region corresponding to the second and subsequent paging occasions, as well as the PDCCH monitoring slot corresponding to the existing paging occasion.

As an example, if no paging message is detected in the preset first PDCCH monitoring slot section, the UE may again perform paging message detection in the added second PDCCH monitoring slot section. By so doing, only the UEs that failed to detect a paging message in the first monitoring section may perform paging message detection in the second monitoring section. In other words, until reception of a paging message succeeds, the UE may sequentially monitor the PDCCH related to the paging message.

Thus, although LBT fails in the preset section, if LBT succeeds in the second monitoring section, the base station may have an additional chance of sending a paging message.

In accordance with an embodiment, the UE may receive configuration information for paging occasion via higher layer signaling. For example, where two paging occasions are configured, the on/off field of the second monitoring section included in the configuration information for paging occasion, second monitoring section information corresponding to the number or length of slots, and setting periodicity of second monitoring section may be set via higher layer signaling.

As an example, where multiple PDCCH monitoring regions are added in the paging frame, the regions that may be monitored for each UE may be designated as, e.g., Supplementary region #0 and #3. Or, the number of the regions which may be monitored for each UE, may be designated like, e.g., N=3, supplementary region #0,#1,#2. In this case, the UE may attempt to detect a P-RNTI-based paging message in the PDCCH monitoring region according to order. Here, the PDCCH scrambled with the P-RNTI may include only scheduling information of the PDSCH having the paging message.

According to an embodiment, the configuration information for paging occasion may include change information about the start position of paging occasion in the paging frame. In other words, the start point of paging occasion in the paging frame may be changed. Accordingly, the transmission position of paging message in the paging frame may be flexibly set.

According to the embodiment described above, the start position for the PDCCH monitoring section is flexibly set and, although transmission of a paging message fails due to LBT failure in the previous paging frame section, the position of PDCCH monitoring may be changed in the next paging frame section, and a paging message may be transmitted. In other words, diversity may be given to the section of attempting an LBT, thereby providing an additional chance of obtaining a channel.

According to the embodiment described above, the length of the paging occasion region and the configured PDCCH monitoring set may not be varied. However, the start slot of monitoring of paging occasion may be changed to a slot other than slot #0. As such, a change in the start position of PO may change the time of performing LBT, thereby distributing the times of performing an LBT by the base station.

Or, in accordance with another embodiment, the configuration information for paging occasion may include information about the monitoring interval of PDCCH in the paging occasion. In other words, the start point of paging occasion in the paging frame may be set with a specific interval.

In this case, if the start point of paging occasion of the UE is indicated, the configured PDCCH monitoring set may be set with a predetermined interval. For example, it is hypothesized that the PDCCH monitoring section of paging occasion is formed of eight slots (slot #0-7). In this case, if the PDCCH monitoring interval is set to two slots, the PDCCHs monitored by the UE to receive the paging message may be transmitted in slot #0, 2, 4, and 6.

Or, in accordance with still another embodiment, the configuration information for paging occasion may include information about the start position corresponding to each of at least two paging occasions. That is, several paging occasion start points may be set in the paging frame. In other words, since the base station has all information about several PO start points, if LBT fails at a specific time, the base station may selectively apply the second, third, or fourth PO start position and transmit a paging message.

Accordingly, the UE may perform PDCCH monitoring for specific PO start points.

According to an embodiment, the configuration information for paging occasion may include offset information for determining the position of the paging frame in the discontinuous reception (DRX) cycle for the UE. That is, a shift pattern of the paging frame (PF) may be set to a specific pattern.

In this case, the index of the radio frame in which the UE receives the paging message may be determined by the system frame number (SFN) and the PF_offset set by RRC. In other words, the PF_offset may be applied to the value determined by UE_ID and DRX cycle T, and the position of the paging frame may be determined. For example, one radio frame among SFN #0 to SFN #1023 is set to the paging frame (PF), and the position may be shifted with a specific offset PF_offset value via RRC signaling. That is, as the PF_offset, a flexible value, rather than a specific value, may apply.

In accordance with an embodiment, the offset value for the paging frame may be explicitly or implicitly determined based on various values. Or, a predetermined pattern may apply. The index of the slot or subframe where the paging message has been detected in the previous PF may be applied as the offset value.

Referring back to FIG. 12, the UE may monitor the downlink control channel (PDCCH) in the paging occasion based on the configuration information (S1210).

The UE may monitor the PDCCH in the PDCCH monitoring region configured based on the configuration information for paging occasion according to each above-described embodiment. The UE may be additionally given a chance for monitoring the PDCCH via a separate paging occasion region added to the existing paging occasion. Thus, the probability of transmission of paging in the unlicensed band may be increased.

According to the embodiments described above, there may be provided a paging method and device in an unlicensed band, which may reduce a paging non-transmission probability due to an LBT failure by configuring an additional paging window for paging in an unlicensed band. There may be provided a paging method and device in an unlicensed band, which may reduce a paging non-transmission probability due to an LBT failure by changing the PDCCH monitoring time for paging in an unlicensed band.

Figure 13:
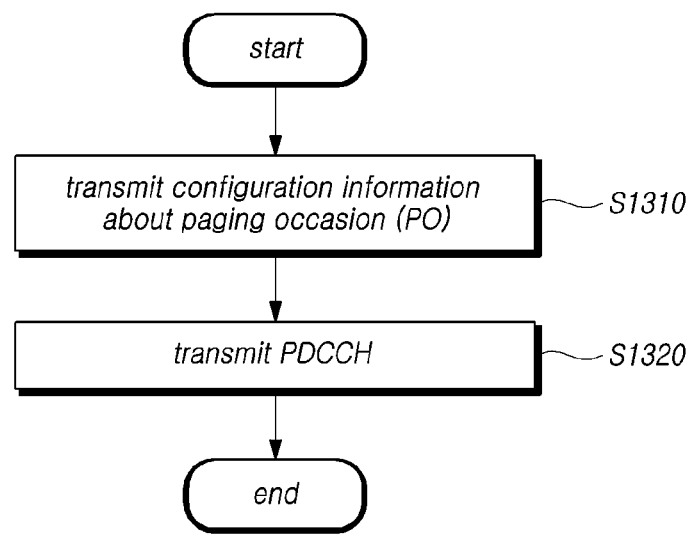
FIG. 13 is a flowchart illustrating a procedure of paging in an unlicensed band by a base station according to an embodiment.

FIG. 13 is a flowchart illustrating a procedure of performing wireless communication in an unlicensed band by a base station according to an embodiment.

Referring to FIG. 13, the base station may transmit configuration information for a paging occasion (PO) for paging in an unlicensed band (S1300).

Paging occurs once in one paging frame. In other words, paging occurs once in one radio frame, and the corresponding message occurs via PDCCH monitoring scrambled with the P-RNTI. The paging occasion may be configured of one slot or subframe or a set formed of several slots or subframes.

According to an embodiment, at least two paging occasions may be configured in the paging frame. That is, the second and subsequent paging occasions may be defined as a PDCCH monitoring region for receiving the paging message additionally configured in the existing paging occasion region. In this case, in the position of one UE, only one paging message is transmitted within one radio frame, and scheduling control information for the paging message may be transmitted via the PDCCH. Accordingly, the UE may have a chance of receiving an additional paging message by monitoring the PDCCH region corresponding to the second and subsequent paging occasions, as well as the PDCCH monitoring slot corresponding to the existing paging occasion.

For example, if no paging message is detected in the preset first PDCCH monitoring slot section, the UE may again perform paging message detection in the added second PDCCH monitoring slot section. By so doing, only the UEs that failed to detect a paging message in the first monitoring section may perform paging message detection in the second monitoring section. In other words, until reception of a paging message succeeds, the UE may sequentially monitor the PDCCH related to the paging message.

Thus, although LBT fails in the preset section, if LBT succeeds in the second monitoring section, the base station may have an additional chance of sending a paging message.

In accordance with an embodiment, the base station may transmit, to the UE, configuration information for paging occasion via higher layer signaling. For example, where two paging occasions are configured, the on/off field of the second monitoring section included in the configuration information for paging occasion, second monitoring section information corresponding to the number or length of slots, and setting periodicity of second monitoring section may be set via higher layer signaling.

As an example, where multiple PDCCH monitoring regions are added in the paging frame, the regions that may be monitored for each UE may be designated as, e.g., Supplementary region #0 and #3. Or, the number of the regions which may be monitored for each UE, may be designated like, e.g., N=3, supplementary region #0,#1,#2. In this case, the UE may attempt to detect a P-RNTI-based paging message in the PDCCH monitoring region according to order. Here, the PDCCH scrambled with the P-RNTI may include only scheduling information of the PDSCH having the paging message.

According to an embodiment, the configuration information for paging occasion may include change information about the start position of paging occasion in the paging frame. In other words, the start point of paging occasion in the paging frame may be changed. Accordingly, the transmission position of paging message in the paging frame may be flexibly set.

According to the embodiments described above, the start position for the PDCCH monitoring section is flexibly set and, although transmission of a paging message fails due to LBT failure in the previous paging frame section, the base station may change the position of PDCCH monitoring in the next paging frame section and transmit a paging message. In other words, diversity may be given to the section of attempting an LBT, thereby providing an additional chance of obtaining a channel.

Accordingly, the length of the paging occasion region and the configured PDCCH monitoring set may not be varied. However, the start slot of monitoring of paging occasion may be changed to a slot other than slot #0. As such, a change in the start position of PO may change the time of performing LBT, thereby distributing the times of performing an LBT by the base station.

Or, the configuration information for paging occasion may include information about the monitoring interval of PDCCH in the paging occasion. In other words, the start point of paging occasion in the paging frame may be set with a specific interval.

In this case, if the start point of paging occasion of the UE is indicated, the configured PDCCH monitoring set may be set with a predetermined interval. For example, it is assumed that the PDCCH monitoring section of paging occasion is formed of eight slots (slot #0-7). In this case, if the PDCCH monitoring interval is set to two slots, the PDCCHs monitored by the UE to receive the paging message may be transmitted in slot #0, 2, 4, and 6.

Alternatively, the configuration information for paging occasion may include information about the start position corresponding to each of at least two paging occasions. That is, several paging occasion start points may be set in the paging frame. In other words, since the base station has all information about several PO start points, if LBT fails at a specific time, the base station may selectively apply the second, third, or fourth PO start position and transmit a paging message.

Accordingly, the UE may perform PDCCH monitoring for specific PO start points.

According to an embodiment, the configuration information for paging occasion may include offset information for determining the position of the paging frame in the discontinuous reception (DRX) cycle for the UE. That is, a shift pattern of the paging frame (PF) may be set to a specific pattern.

In this case, the index of the radio frame in which the UE receives the paging message may be determined by the system frame number (SFN) and the PF_offset set by RRC. In other words, the PF_offset may be applied to the value determined by UE_ID and DRX cycle T, and the position of the paging frame may be determined. For example, one radio frame among SFN #0 to SFN #1023 is set to the paging frame (PF), and the position may be shifted with a specific offset PF_offset value via RRC signaling. That is, as the PF_offset, a flexible value, rather than a specific value, may apply.

As an example, the offset value for the paging frame may be explicitly or implicitly determined based on various values. Or, a predetermined pattern may apply. The index of the slot or subframe where the paging message has been detected in the previous PF may be applied as the offset value.

Referring back to FIG. 13, the base station may transmit the downlink control channel (PDCCH) in the paging occasion based on configuration information (S1310).

The base station may transmit the PDCCH in the PDCCH monitoring region configured based on the configuration information for paging occasion according to each above-described embodiment. Thus, the UE may be additionally given a chance for monitoring the PDCCH via a separate paging occasion region added to the existing paging occasion. Thus, the probability of transmission of paging in the unlicensed band may be increased.

According to the embodiments described above, there may be provided a paging method and device in an unlicensed band, which may reduce a paging non-transmission probability due to an LBT failure by configuring an additional paging window for paging in an unlicensed band. There may be provided a paging method and device in an unlicensed band, which may reduce a paging non-transmission probability due to an LBT failure by changing the PDCCH monitoring time for paging in an unlicensed band.

Hereinafter, each embodiment for performing paging in an unlicensed band will be described in detail with reference to the relevant drawings.

Currently, in NR-U, a stand-alone design for an unlicensed band is taken into consideration. At this time, a corresponding predetermined transmission may be impossible in the slots where transmission for determined channels has been determined. This is why NR-U itself performs transmission of all channels and signals based on LBT. Among them, there is needed a method for addressing the paging non-transmission issue with the UE in the RRC_idle state.

According to the disclosure, there is proposed a paging method for unlicensed bands in NR. Specifically, the present disclosure introduces a method for changing the PDCCH monitoring time and configuring an additional window in the DRX cycle to reduce the probability of paging non-transmission due to LBT failure.

In connection with initial access for unlicensed band access in NR, NR-U requires a signal including the SS/PBCH block burst set transmission.

For the initial access procedure, the following modifications may be advantageous. A modification to the initial access procedure considering a channel access restriction based on LBT requires development of technology for handling SS/PBCH block and RMSI transmission opportunities reduced due to LBT failure.

An enhancement to 4-step RACH is a mechanism for handling message 1/2/3/4 transmission opportunities reduced due to LBT failure, and the 2-step RACH has a potential advantage in channel access.

The present disclosure introduces a method for enhancing LBT-based paging transmission in NR-U as follows. The embodiments described below may be performed individually or in combination.

Embodiment 1. A supplementary PDCCH monitoring region ($2^{nd}$ monitoring section) may be added in the paging frame (PF), and the UE may selectively perform paging monitoring.

Basically, the paging frame (PF) may mean one radio frame which is 10 ms long. That is, the paging frame (PF) denotes a specific radio frame of the UE's DRX cycle. One radio frame includes a total of 10 subframes (=1 ms). The PDCCH is actually transmitted in the slot. If the subcarrier spacing (SCS) is 15 kHz, the slot and the subframe have the same length so that one radio frame has 10 slots, and there are up to 10 PDCCH monitoring candidates.

For paging, one paging occasion (PO) occurs within one PF. Here, PO means the number of times in which paging is actually performed. In other words, paging occurs once in one radio frame, and the corresponding message occurs via PDCCH monitoring scrambled with the P-RNTI. The PO may be configured of one slot or subframe or a set formed of several slots or subframes.

The $2^{nd}$ PDCCH region in the disclosure is defined as a PDCCH monitoring region for receiving a paging message additionally configured in the existing PO region. In this case, in the position of one UE, only one paging message is transmitted within one radio frame, and scheduling control information for the message is transmitted via the PDCCH. Accordingly, the UE may have a chance of receiving an additional paging message by monitoring the 2nd PDCCH region, as well as the PDCCH monitoring slot corresponding to the existing PO.

Figure 14:
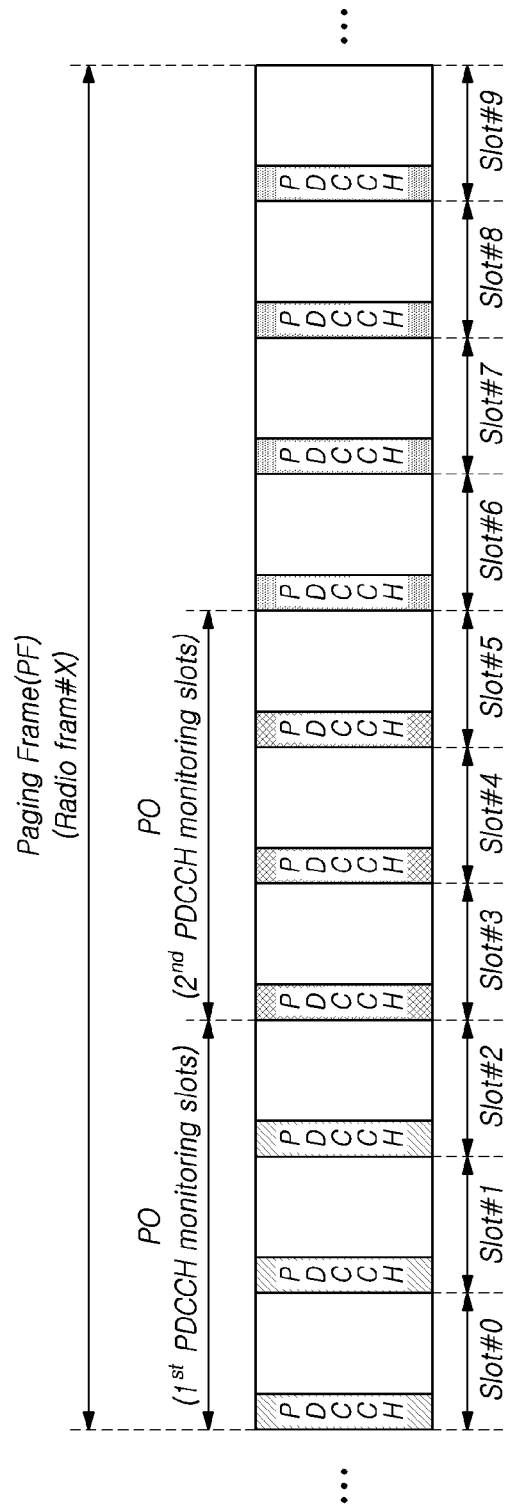
FIG. 14 is a view illustrating an example of a supplementary paging occasion according to an embodiment.

Referring to FIG. 14, the same principle applies in defining, in the UE, one PO section within the PF. A paging message detection section may be defined in slot #0-2 in the first PDCCH monitoring section shown in hatching and in slot #3-5 in the second PDCCH monitoring section shown in cross hatching.

As an example, if no paging message is detected in the preset first PDCCH monitoring slot section, the UE may one more time perform paging message detection in the second PDCCH monitoring slot section which is an additional (supplementary) PDCCH monitoring slot. By so doing, the UE need not perform PDCCH monitoring always in all of the slots, and only UEs which failed to detect the paging message in the first monitoring section perform paging message detecting in the second monitoring section.

Thus, although LBT fails in the preset section, if LBT succeeds in the second monitoring section, the gNB may have an additional chance of sending a paging message. The application of the corresponding region may be configured via higher layer signaling.

The 2nd monitoring section on/off field, the 2nd monitoring section information which is the number or length of slots, and 2nd monitoring section setting period may be set via higher layer signaling. In this case, the 2nd monitoring section setting period may be set to be identical to the PF periodically set or with a different period. For example, if the PF is 20 radio frames, the period of the 2nd monitoring may be set to 40 radio frames. At this time, the 2nd monitoring section may be periodically set in an even or odd PF section.

Embodiment 1-1. Multiple Supplementary PDCCH Monitoring Regions May be Added in the Paging Frame (PF), and the UE May Selectively Perform Paging Monitoring Embodiment 1-1 corresponds to an extension case of embodiment 1 described above. In other words, several supplementary PDCCH monitoring regions may be defined and, as in embodiment 1, be applied.

As an example, where multiple supplementary PDCCH monitoring regions are used, the regions that may be monitored for each UE may be designated as, e.g., Supplementary region #0 and #3. Or, the number of the regions which may be monitored for each UE, may be designated like, e.g., N=3, supplementary region #0,#1,#2. In this case, the UE may attempt to detect a P-RNTI-based paging message in the PDCCH monitoring region according to order. Here, the PDCCH scrambled with the P-RNTI may include only scheduling information of the PDSCH having the paging message.

Embodiment 2. The Start Point of Paging Occasion (PO) in the Paging Frame (PF) May be Changed In embodiment 2, unlike the above-described embodiment 1 or embodiment 1-1, the transmission position of paging message in the paging frame (PF) is not fixed but may be set flexibly.

In legacy LTE/NR, the position or section where the UE is to perform PDCCH monitoring is fixed, and the UE detects the paging message.

According to embodiment 2, the start position for the PDCCH monitoring section is flexibly set and, although LBT fails in the previous PF section so that paging message transmission fails, the PDCCH monitoring position may be changed so that there is a chance of transmission of a paging message in the next PF section. In other words, diversity may be given to the section of attempting an LBT, thereby providing an additional chance of obtaining a channel.

Figure 15:
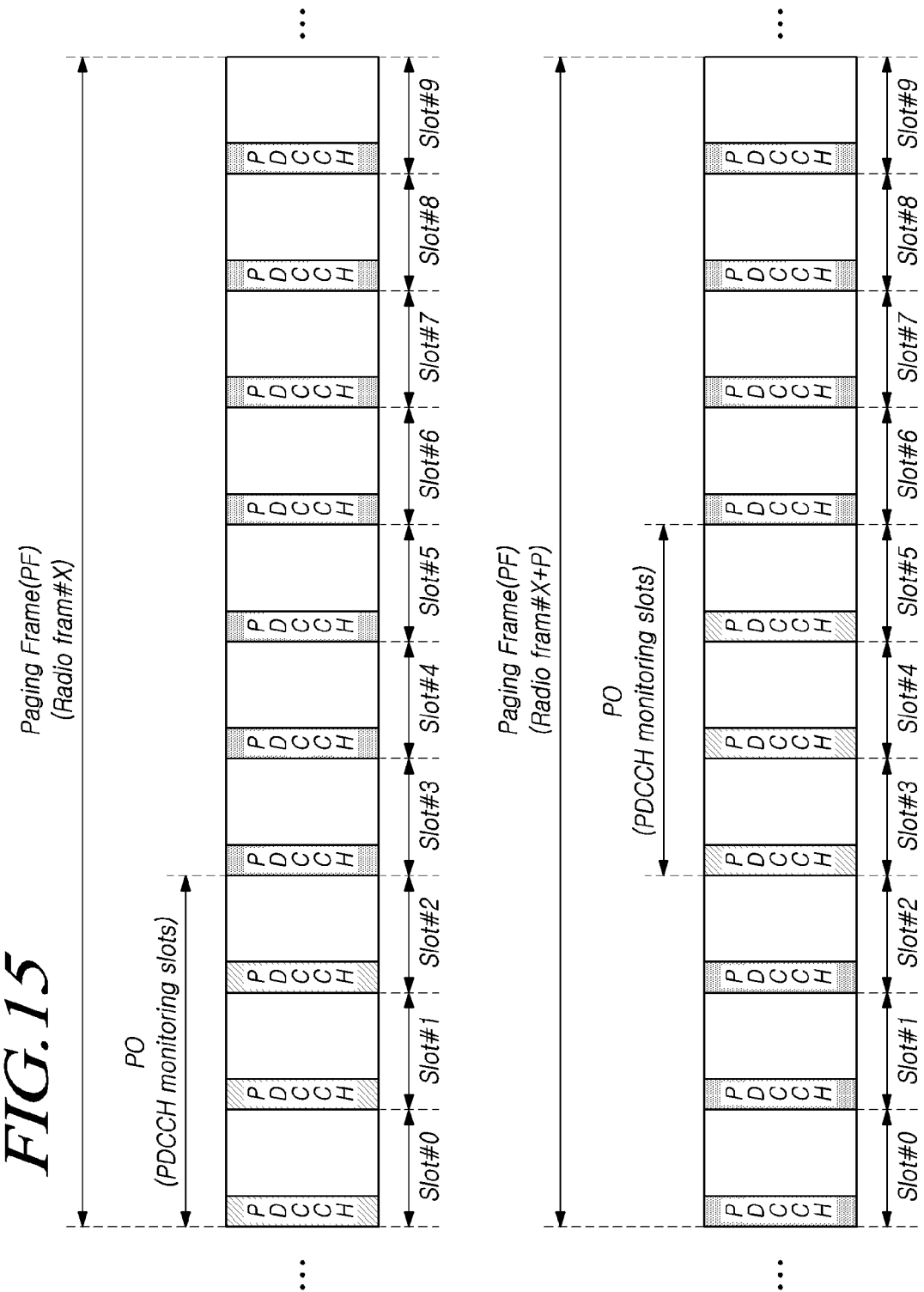
FIG. 15 is a view illustrating an example of changing a start position of a paging occasion according to an embodiment.

As shown in FIG. 15, the paging information configured via typical RRC signaling is configured as slot #0-2 in hatching, like the one applied to radio frame #X. According to the instant embodiment, the length of PO and configured PDCCH monitoring set may be unchanged. However, the monitoring start slot of PO may be changed to slot #3, not slot #0, in radio frame #X+P. Here, P means the period of PF.

A change in the start position of PO may change the time of performing LBT, thereby distributing the times of performing an LBT by the gNB. A method for changing the PF, i.e., the start position of the PO indicating the PDCCH monitoring section in the paging radio frame may be determined based on a value set based on RRC.

Accordingly, the start point of PO may be changed as follows, in addition to the paging signaling set by RRC.

Typically, the start position of PO may be defined by the equation: i_s=floor (UE_ID/N) mod Ns and, according to embodiment 2, i_s may be changed as follows.

The changed i_s' may be defined as i_s'=(i_s+N_add)mod N_slot or as i_s'=(i_s+N_add)mod N_sf.

Here, N_slot is the number of slots in one radio frame. For example, if SCS=15 kHz, N_slot=10 and, if SCS=30 kHz, N_slot=20. Further, N_sf is the number of subframes in one radio frame and N_sf=10 all the time.

N_add is the value to actually change the start point of PO and the following factors may be used. The radio frame index, which is the radio frame index set by the PF frame, UE-RNTI, cell ID, antenna ports, or a predefined pattern, and variables by time values may be used.

In other words, if the PDCCH monitoring set is configured of multiple slots in setting the N_add value, the start point of paging occasion (PO) in the paging frame (PF) may be rendered to have a shift pattern according to a specific value, by the added N_add value.

Embodiment 2-1. The Start Point of Paging Occasion (PO) in the Paging Frame (PF) May be Set with a Specific Interval According to embodiment 2-1, such a new pattern may be proposed in which if the start point of PO of the UE is indicated, the configured PDCCH monitoring set is set with a predetermined interval. In other words, the PDCCH monitoring set may be configured of all the slots in one radio frame designated as the maximum PF. However, where such PDCCH monitoring section is always configured, power consumption for the UE's PDCCH detection occurs and, thus, a predetermined interval may be placed. Thus, the PO may be set as follows: PO={i_s, i_s+N_gap, i_s+2*N_gap, . . . }.

Figure 16:
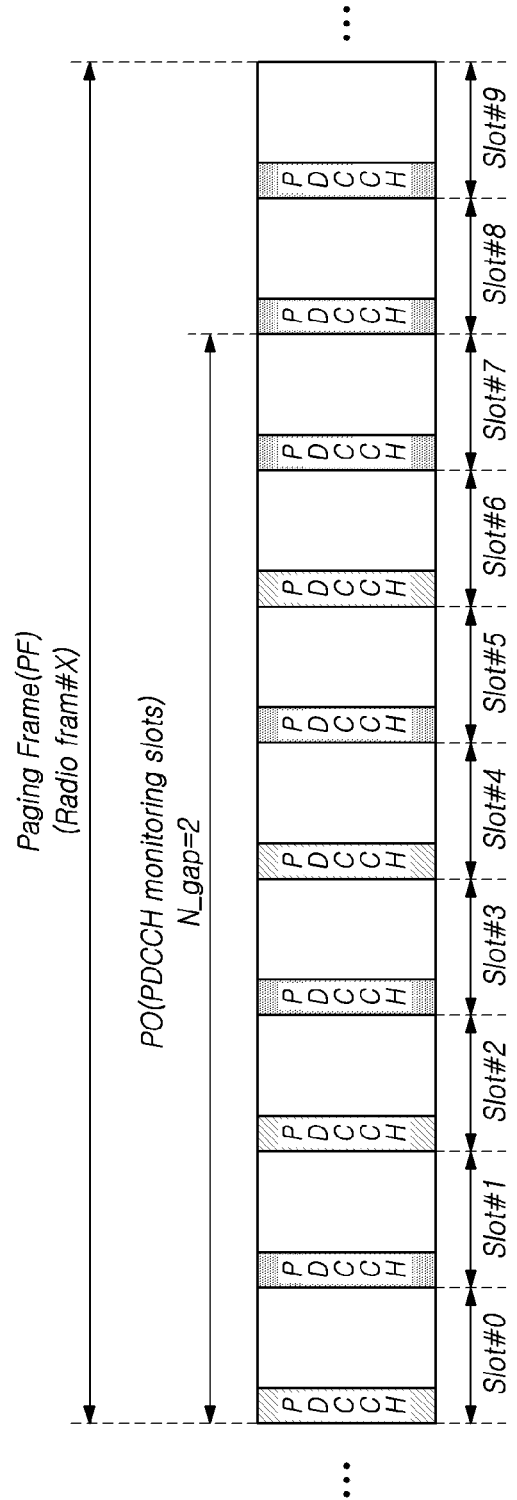
FIG. 16 is a view illustrating an example of setting a PDCCH monitoring interval in a paging occasion according to an embodiment.

For example, referring to FIG. 16, the PDCCH monitoring section which is the entire PO is configured of eight slots (slot #0-7). According to embodiment 2-1, if N_gap=2, the PDCCH monitoring interval is two slots. Thus, the PDCCHs monitored for the UE to receive the paging message may be transmitted in slot #0, 2, 4, and 6 shown in hatching.

Embodiment 2-2. The Start Points of Several Paging Occasions (POs) in the Paging Frame (PF) May be Set In embodiment 2-2, as in the above-described embodiment 2, several start points for paging change times may be set.

In other words, since the gNB has several PO start points, if LBT fails at a specific time, the base station may selectively apply the second, third, or fourth PO start position and transmit a paging message.

In such a case, the UE needs to perform PDCCH monitoring for specific PO start points.

Embodiment 3. A Shift Pattern of the Paging Frame (PF) May be Set to a Specific Pattern According to embodiment 3, upon configuring an NR paging frame, the following equation may apply: (SFN+PF_offset) mod T=(T div N)*(UE_ID mod N).

That is, the index of the radio frame in which the UE receives the paging message may be determined by the system frame number (SFN) and the PF_offset set by RRC.

In other words, the position may be determined by the PF_offset, in the value determined by the UE_ID and the configured DRX cycle T. That is, one radio frame among SFN #0 to SFN #1023 is set to the paging frame (PF), and the position may be shifted with a specific offset PF_offset value via RRC signaling. According to embodiment 3, as the PF_offset, a flexible value, rather than a specific value, may apply.

That is, the SFN of the PF selected by the UE is determined as one value which may be changed. Thus, the existing PF_offset may be changed to PF_offset_i. Here, i may be 0, 1, 2, 3, . . . .

Thus, the PF index may be changed to first SFN+PF_offset_0(=0), second SFN+PF_offset_1(=2), or SFN+PF_offset_1(=3) depending on the transmission time.

As an example, PF_offset_i may be explicitly or implicitly determined based on various values.

Or, a predefined pattern may apply. The index of the slot or subframe where the paging message has been detected in the previous PF may be applied as PF_offset_i. For example, if the index of the PF in the previous DRX cycle is radio frame #N, and the index of the slot or subframe in which the paging message has been detected is N_x, the radio frame index of the next PF may be newly defined as SFN+N_x. In this case, the role of N_x is the same as that of the PF_offset defined in the existing NR paging.

According to the embodiments described above, there may be provided a paging method and device in an unlicensed band, which may reduce a paging non-transmission probability due to an LBT failure by configuring an additional paging window for paging in an unlicensed band. There may be provided a paging method and device in an unlicensed band, which may reduce a paging non-transmission probability due to an LBT failure by changing the PDCCH monitoring time for paging in an unlicensed band.

Hereinafter, structural configurations of a UE and a base station which may perform all or some of the embodiments described above in connection with FIGS. 1 to 16 will be described in detail with reference to the accompanying drawings.

Figure 17:
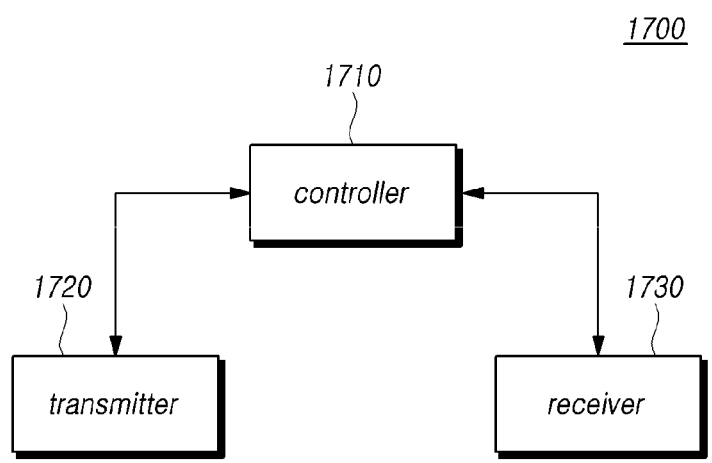
FIG. 17 is a block diagram illustrating a user equipment according to an embodiment.

FIG. 17 is a block diagram illustrating a user equipment (UE) according to another embodiment.

Referring to FIG. 17, according to an embodiment, a UE 1700 includes a controller 1710, a transmitter 1720, and a receiver 1730.

The controller 1710 controls the overall operation of the UE 1700 according to the method for performing wireless communication in an unlicensed band needed to perform the above-described disclosure. The transmitter 1720 transmits uplink control information and data or messages to the base station via a corresponding channel. The receiver 1730 receives downlink control information and data or messages from the base station via a corresponding channel.

The receiver 1730 may receive configuration information for a paging occasion (PO) for paging in an unlicensed band. Paging occurs once in one radio frame, and the corresponding message occurs via PDCCH monitoring scrambled with the P-RNTI. The paging occasion may be configured of one slot or subframe or a set formed of several slots or subframes.

According to an embodiment, at least two paging occasions may be configured in the paging frame. That is, the second and subsequent paging occasions may be defined as a PDCCH monitoring region for receiving the paging message additionally configured in the existing paging occasion region. Accordingly, the controller 1710 may monitor the PDCCH region corresponding to the second and subsequent paging occasions, as well as the PDCCH monitoring slot corresponding to the existing paging occasion. Thus, the UE 1700 may have an additional chance of receiving a paging message.

As an example, if no paging message is detected in the preset first PDCCH monitoring slot section, the controller 1710 may again perform paging message detection in the added second PDCCH monitoring slot section. By so doing, only the UEs that failed to detect a paging message in the first monitoring section may perform paging message detection in the second monitoring section. In other words, until reception of a paging message succeeds, the controller 1710 may sequentially monitor the PDCCH related to the paging message.

Thus, although LBT fails in the preset section, if LBT succeeds in the second monitoring section, the base station may have an additional chance of sending a paging message.

As an example, the receiver 1730 may receive configuration information for paging occasion via higher layer signaling. For example, where two paging occasions are configured, the on/off field of the second monitoring section included in the configuration information for paging occasion, second monitoring section information corresponding to the number or length of slots, and setting periodicity of second monitoring section may be set via higher layer signaling.

As an example, where multiple PDCCH monitoring regions are added in the paging frame, the regions that may be monitored for each UE may be designated as, e.g., Supplementary region #0 and #3. Or, the number of the regions which may be monitored for each UE, may be designated like, e.g., N=3, supplementary region #0, #1, #2. In this case, the controller 1710 may attempt to detect a P-RNTI-based paging message in the PDCCH monitoring region according to order. Here, the PDCCH scrambled with the P-RNTI may include only scheduling information of the PDSCH having the paging message.

According to an embodiment, the configuration information for paging occasion may include change information about the start position of paging occasion in the paging frame. In other words, the start point of paging occasion in the paging frame may be changed. Accordingly, the transmission position of paging message in the paging frame may be flexibly set.

According to the embodiments described above, the start position for the PDCCH monitoring section is flexibly set and, although transmission of a paging message fails due to LBT failure in the previous paging frame section, the position of PDCCH monitoring may be changed in the next paging frame section, and a paging message may be transmitted. In other words, diversity may be given to the section of attempting an LBT, thereby providing an additional chance of obtaining a channel.

According to the embodiments described above, the length of the paging occasion region and the configured PDCCH monitoring set may not be varied. However, the start slot of monitoring of paging occasion may be changed to a slot other than slot #0. As such, a change in the start position of PO may change the time of performing LBT, thereby distributing the times of performing an LBT by the base station.

Or, the configuration information for paging occasion may include information about the monitoring interval of PDCCH in the paging occasion. In other words, the start point of paging occasion in the paging frame may be set with a specific interval.

In this case, if the start point of paging occasion of the UE is indicated, the configured PDCCH monitoring set may be set with a predetermined interval. For example, it is assumed that the PDCCH monitoring section of paging occasion is formed of eight slots (slot #0-7). In this case, if the PDCCH monitoring interval is set to two slots, the PDCCHs monitored by the UE to receive the paging message may be transmitted in slot #0, 2, 4, and 6.

Or, the configuration information for paging occasion may include information about the start position corresponding to each of at least two paging occasions. That is, several paging occasion start points may be set in the paging frame. In other words, since the base station has all information about several PO start points, if LBT fails at a specific time, the base station may selectively apply the second, third, or fourth PO start position and transmit a paging message.

Accordingly, the controller 1710 may perform PDCCH monitoring for specific PO start points.

According to an embodiment, the configuration information for paging occasion may include offset information for determining the position of the paging frame in the discontinuous reception (DRX) cycle for the UE. That is, a shift pattern of the paging frame (PF) may be set to a specific pattern.

In this case, the index of the radio frame in which the UE receives the paging message may be determined by the system frame number (SFN) and the PF_offset set by RRC. In other words, the PF_offset may be applied to the value determined by UE_ID and DRX cycle T, and the position of the paging frame may be determined. For example, one radio frame among SFN #0 to SFN #1023 is set to the paging frame (PF), and the position may be shifted with a specific offset PF_offset value via RRC signaling. That is, as the PF_offset, a flexible value, rather than a specific value, may apply.

As an example, the offset value for the paging frame may be explicitly or implicitly determined based on various values. Or, a predetermined pattern may apply. The index of the slot or subframe where the paging message has been detected in the previous PF may be applied as the offset value.

The controller 1710 may monitor the downlink control channel (PDCCH) in the paging occasion based on the configuration information. The controller 1710 may monitor the PDCCH in the PDCCH monitoring region configured based on the configuration information for paging occasion according to each above-described embodiment. The UE 1700 may be additionally given a chance for monitoring the PDCCH via a separate paging occasion region added to the existing paging occasion. Thus, the probability of transmission of paging in the unlicensed band may be increased.

According to the embodiments described above, there may be provided a paging method and device in an unlicensed band, which may reduce a paging non-transmission probability due to an LBT failure by configuring an additional paging window for paging in an unlicensed band. There may be provided a paging method and device in an unlicensed band, which may reduce a paging non-transmission probability due to an LBT failure by changing the PDCCH monitoring time for paging in an unlicensed band.

Figure 18:
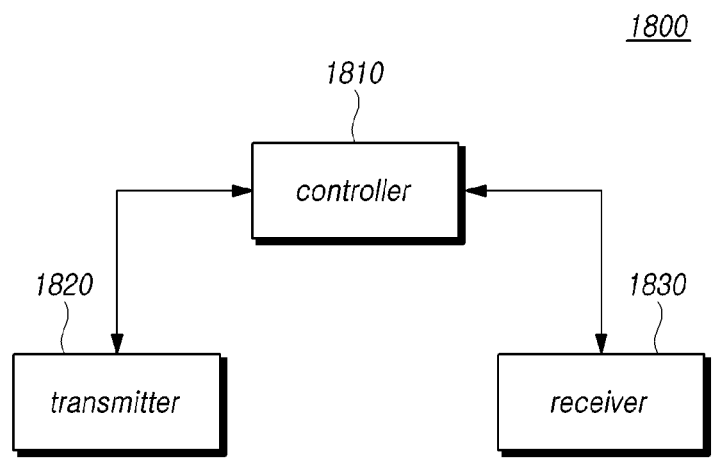
FIG. 18 is a block diagram illustrating a base station according to an embodiment.

FIG. 18 is a block diagram illustrating a base station 1800 according to an embodiment.

Referring to FIG. 18, according to an embodiment, a base station 1800 includes a controller 1810, a transmitter 1820, and a receiver 1830.

The controller 1810 controls the overall operation of the base station 1800 according to the method of performing paging in an unlicensed band needed to perform the above-described disclosure. The transmitter 1820 and the receiver 1830 are used to transmit or receive signals or messages or data necessary for performing the above-described disclosure, with the UE.

The transmitter 1820 may transmit, to the UE, configuration information for a paging occasion (PO) for paging in an unlicensed band. Paging occurs once in one radio frame, and the corresponding message occurs via PDCCH monitoring scrambled with the P-RNTI. The paging occasion may be configured of one slot or subframe or a set formed of several slots or subframes.

According to an embodiment, at least two paging occasions may be configured in the paging frame. That is, the second and subsequent paging occasions may be defined as a PDCCH monitoring region for receiving the paging message additionally configured in the existing paging occasion region. Accordingly, the UE may monitor the PDCCH region corresponding to the second and subsequent paging occasions, as well as the PDCCH monitoring slot corresponding to the existing paging occasion. Thus, the UE may have an additional chance of receiving a paging message.

As an example, if no paging message is detected in the preset first PDCCH monitoring slot section, the UE may again perform paging message detection in the added second PDCCH monitoring slot section. By so doing, only the UEs that failed to detect a paging message in the first monitoring section may perform paging message detection in the second monitoring section. In other words, until reception of a paging message succeeds, the UE may sequentially monitor the PDCCH related to the paging message.

Thus, although LBT fails in the preset section, if LBT succeeds in the second monitoring section, the base station 1800 may have an additional chance of sending a paging message.

In accordance with an embodiment, the transmitter 1820 may transmit configuration information for paging occasion via higher layer signaling. For example, where two paging occasions are configured, the on/off field of the second monitoring section included in the configuration information for paging occasion, second monitoring section information corresponding to the number or length of slots, and setting periodicity of second monitoring section may be set via higher layer signaling.

For example, where multiple PDCCH monitoring regions are added in the paging frame, the regions that may be monitored for each UE may be designated as, e.g., Supplementary region #0 and #3. Or, the number of the regions which may be monitored for each UE, may be designated like, e.g., N=3, supplementary region #0,#1,#2. In this case, the UE may attempt to detect a P-RNTI-based paging message in the PDCCH monitoring region according to order. Here, the PDCCH scrambled with the P-RNTI may include only scheduling information of the PDSCH having the paging message.

According to an embodiment, the configuration information for paging occasion may include change information about the start position of paging occasion in the paging frame. In other words, the start point of paging occasion in the paging frame may be changed. Accordingly, the transmission position of paging message in the paging frame may be flexibly set.

According to the embodiments described above, the start position for the PDCCH monitoring section is flexibly set and, although transmission of a paging message fails due to LBT failure in the previous paging frame section, the position of PDCCH monitoring may be changed in the next paging frame section, and a paging message may be transmitted. In other words, diversity may be given to the section of attempting an LBT, thereby providing an additional chance of obtaining a channel.

According to the embodiments described above, the length of the paging occasion region and the configured PDCCH monitoring set may not be varied. However, the start slot of monitoring of paging occasion may be changed to a slot other than slot #0. As such, a change in the start position of PO may change the time of performing LBT, thereby distributing the times of performing an LBT by the base station 1800.

Or, the configuration information for paging occasion may include information about the monitoring interval of PDCCH in the paging occasion. In other words, the start point of paging occasion in the paging frame may be set with a specific interval.

In this case, if the start point of paging occasion of the UE is indicated, the configured PDCCH monitoring set may be set with a predetermined interval. For example, it is hypothesized that the PDCCH monitoring section of paging occasion is formed of eight slots (slot #0-7). In this case, if the PDCCH monitoring interval is set to two slots, the PDCCHs monitored by the UE to receive the paging message may be transmitted in slot #0, 2, 4, and 6.

Or, the configuration information for paging occasion may include information about the start position corresponding to each of at least two paging occasions. That is, several paging occasion start points may be set in the paging frame. In other words, since the base station 1800 has all information about several PO start points, if LBT fails at a specific time, the transmitter 1820 may selectively apply the second, third, or fourth PO start position and transmit a paging message.

Accordingly, the UE may perform PDCCH monitoring for specific PO start points.

According to an embodiment, the configuration information for paging occasion may include offset information for determining the position of the paging frame in the discontinuous reception (DRX) cycle for the UE. That is, a shift pattern of the paging frame (PF) may be set to a specific pattern.

In this case, the index of the radio frame in which the UE receives the paging message may be determined by the system frame number (SFN) and the PF_offset set by RRC. In other words, the PF_offset may be applied to the value determined by UE_ID and DRX cycle T, and the position of the paging frame may be determined. For example, one radio frame among SFN #0 to SFN #1023 is set to the paging frame (PF), and the position may be shifted with a specific offset PF_offset value via RRC signaling. That is, as the PF_offset, a flexible value, rather than a specific value, may apply.

As an example, the offset value for the paging frame may be explicitly or implicitly determined based on various values. Or, a predetermined pattern may apply. The index of the slot or subframe where the paging message has been detected in the previous PF may be applied as the offset value.

The transmitter 1820 may transmit the downlink control channel (PDCCH) in the paging occasion based on the configuration information. The transmitter 1820 may transmit the PDCCH in the PDCCH monitoring region configured based on the configuration information for paging occasion according to each above-described embodiment. That is, the UE may be additionally given a chance for monitoring the PDCCH via a separate paging occasion region added to the existing paging occasion. Thus, the probability of transmission of paging in the unlicensed band may be increased.

According to the embodiments described above, there may be provided a paging method and device in an unlicensed band, which may reduce a paging non-transmission probability due to an LBT failure by configuring an additional paging window for paging in an unlicensed band. There may be provided a paging method and device in an unlicensed band, which may reduce a paging non-transmission probability due to an LBT failure by changing the PDCCH monitoring time for paging in an unlicensed band.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing paging in an unlicensed band by a user equipment (UE), the method comprising:
   receiving configuration information about a paging occasion (PO) for paging in the unlicensed band; and
   monitoring a downlink control channel (PDCCH) in the paging occasion based on the configuration information,
   wherein the monitoring of the PDCCH includes monitoring a paging message by identifying whether there is a PDCCH scrambled with a paging—radio network temporary identifier (P-RNTI) in the paging occasion configured of a plurality of PDCCH monitoring regions, and
   wherein the configuration information includes information indicating a number of the plurality of PDCCH monitoring regions constituting the paging occasion and start position information for the PDCCH monitoring region.

2. The method of claim 1, wherein the information indicating the number of the plurality of PDCCH monitoring regions is 2 or 3.

3. The method of claim 1, wherein the plurality of PDCCH monitoring regions is configured at a predetermined interval, and wherein the predetermined interval is 1.

4. The method of claim 1, wherein the monitoring of the PDCCH includes, when there is no PDCCH scrambled with the P-RNTI in a first PDCCH monitoring region among the plurality of PDCCH monitoring regions, monitoring whether the PDCCH scrambled with the P-RNTI is present in a second PDCCH monitoring region.

5. A method for performing paging in an unlicensed band by a base station, the method comprising:
   transmitting configuration information about a paging occasion (PO) for paging in the unlicensed band; and
   transmitting a downlink control channel (PDCCH) in the paging occasion based on the configuration information,
   wherein the transmitting of the PDCCH includes a PDCCH scrambled with a paging—radio network temporary identifier (P-RNTI) in the paging occasion configured of a plurality of PDCCH monitoring regions, and
   wherein the configuration information includes information indicating a number of the plurality of PDCCH monitoring regions constituting the paging occasion and start position information for the PDCCH monitoring region.

6. The method of claim 5, wherein the information indicating the number of the plurality of PDCCH monitoring regions is 2 or 3.

7. The method of claim 5, wherein the plurality of PDCCH monitoring regions may be configured at a predetermined interval, and wherein the predetermined interval is 1.

8. The method of claim 5, wherein the transmitting of the PDCCH includes transmitting the PDCCH scrambled with the P-RNTI only in any one PDCCH monitoring region among the plurality of PDCCH monitoring regions.

9. A user equipment (UE) for performing paging in an unlicensed band, the UE comprising:
   a receiver configured to receive configuration information about a paging occasion (PO) for paging in the unlicensed band; and
   a controller configured to monitor a downlink control channel (PDCCH) in the paging occasion based on the configuration information,
   wherein the controller monitors a paging message by identifying whether there is a PDCCH scrambled with a paging-radio network temporary identifier (P-RNTI) in the paging occasion configured of a plurality of PDCCH monitoring regions, and
   wherein the configuration information includes information indicating a number of the plurality of PDCCH monitoring regions constituting the paging occasion and start position information for the PDCCH monitoring region.

10. The UE of claim 9, wherein the information indicating the number of the plurality of PDCCH monitoring regions is 2 or 3.

11. The UE of claim 9, wherein the plurality of PDCCH monitoring regions may be configured at a predetermined interval, and wherein the predetermined interval is 1.

12. The UE of claim 9, wherein when there is no PDCCH scrambled with the P-RNTI in a first PDCCH monitoring region among the plurality of PDCCH monitoring regions, the controller monitors whether the PDCCH scrambled with the P-RNTI is present in a second PDCCH monitoring region.

* * * * *